United States Patent [19]

Dumas

[11] 4,240,935
[45] Dec. 23, 1980

[54] KETENE DIMER PAPER SIZING COMPOSITIONS

[75] Inventor: David H. Dumas, Wilmington, Del.

[73] Assignee: Hercules Incorporated, Wilmington, Del.

[21] Appl. No.: 973,054

[22] Filed: Dec. 22, 1978

[51] Int. Cl.$^3$ .......................... C08L 77/06; C08L 1/02
[52] U.S. Cl. ......................... 260/9; 162/158; 162/164 EP; 260/29.2 N; 260/29.2 EP
[58] Field of Search .................. 260/29.2 N, 29.2 EP, 260/9; 162/158, 164 EP

[56] References Cited

U.S. PATENT DOCUMENTS

| | | | |
|---|---|---|---|
| 2,627,477 | 2/1953 | Downey | 106/170 |
| 2,762,270 | 9/1956 | Keim et al. | 162/158 |
| 2,785,067 | 3/1957 | Osberg | 162/158 |
| 2,926,116 | 2/1960 | Keim | 162/164 |
| 2,926,154 | 2/1960 | Keim | 260/29.2 N |
| 3,006,806 | 10/1961 | Schur | 162/158 |
| 3,050,437 | 8/1962 | Arlt | 162/158 |
| 3,311,532 | 3/1967 | Kulick et al. | 162/179 |
| 3,403,113 | 9/1968 | Deithelm et al. | 260/29.2 N |
| 3,483,077 | 12/1969 | Aldrich | 162/158 |
| 3,931,069 | 1/1976 | Lundin | 162/158 |

Primary Examiner—Wilbert J. Briggs, Sr.
Attorney, Agent, or Firm—John W. Whitson

[57] ABSTRACT

Improved paper sizing compositions are composed of a ketene dimer, an anionic dispersing agent such as sodium lignin sulfonate, certain water-soluble, cationic resins and water. Exemplary of the cationic resins is the reaction product of epichlorohydrin and the aminopolyamide derived from adipic acid and diethylenetriamine.

8 Claims, No Drawings

KETENE DIMER PAPER SIZING COMPOSITIONS

This invention relates to improved paper sizing compositions. More particularly, it relates to such compositions containing hydrophobic cellulose-reactive ketene dimers.

The aforementioned ketene dimers are well known as paper sizing agents. Sizing compositions containing the dimers are also well known and have been described as comprising nonionic, cationic and anionic dispersing agents, cationic resins and various other additives. However, there has remained the need for a stable dispersion of a ketene dimer having greatly improved sizing efficiency.

Now in accordance with this invention, it has been found that improved sizing of paper can be obtained through utilization of a ketene dimer dispersion which, apart from minor amounts of certain additives such as alum or a biocide, consists essentially of the dimer, an anionic dispersing agent selected from the group consisting of sodium lignin sulfonate, the condensation product of formaldehyde and sodium naphthalene sulfonate and mixtures thereof, a cationic resin which is the reaction product of epichlorohydrin with a polymer selected from the group consisting of (a) an aminopolyamide derived from a dicarboxylic acid and a polyalkylene polyamine having two primary amine groups and at least one secondary or tertiary amine group, or (b) a condensate of cyanamide or dicyandiamide with a polyalkylene polyamine having the formula $H_2N(C_nH_{2n}NH)_xH$, wherein n is an integer 2 through 8 and x is an integer 2 or more, and water. Exemplary of the cationic resins is the reaction product of epichlorohydrin and the aminopolyamide derived from adipic acid and diethylenetriamine.

The above dispersions are prepared, for example, by forming an emulsion containing the ketene dimer, the dispersing agent and water, homogenizing this emulsion to form small particles of the dimer, adding to the homogenized emulsion an aqueous solution of the cationic resin, resulting in a thick emulsion containing agglomerated particles, and subjecting the thick emulsion to the action of shear to redisperse the agglomerated particles. The resulting dispersion is stable and is an efficient sizing composition.

The ketene dimers used in accordance with this invention have the formula $[RCH=C=O]_2$ where $R_2$ is a hydrocarbon radical, such as alkyl having at least 8 carbon atoms, cycloalkyl having at least 6 carbon atoms, aryl, aralkyl and alkaryl. In naming ketene dimers, the radical "$R_2$" is named followed by "ketene dimer". Thus, phenyl ketene dimer is

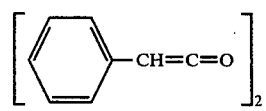

benzyl ketene is:

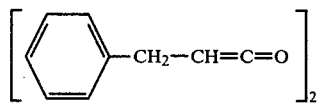

and decyl ketene dimer is: $[C_{10}H_{21}—CH=C=O]_2$. Examples of ketene dimers include octyl, decyl, dodecyl, tetradecyl, hexadecyl, octadecyl, eicosyl, docosyl, tetracosyl, phenyl, benzyl beta-naphthyl and cyclohexyl ketene dimers, as well as the ketene dimers prepared from montamic acid, naphthenic acid, $\Delta9,10$-decylenic acid, $\Delta9,10$-dodecylenic acid, palmitoleic acid, oleic acid, ricinoleic acid, linoleic acid, linolenic acid and eleostearic acid, as well as ketene dimers prepared from naturally occurring mixtures of fatty acids, such as those mixtures in coconut oil, babassu oil, palm kernel oil, palm oil, olive oil, peanut oil, rape oil, beef tallow, lard (leaf) and whale blubber. Mixtures of any of the above-named fatty acids with each other may also be used.

One group of cationic resins used in preparing the dispersions of this invention is composed of the reaction products of epichlorohydrin and an aminopolyamide derived from a dicarboxylic acid and a polyalkylene polyamine having two primary amino groups and at least one secondary or tertiary amine group. Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid, and sebacic acid. Other suitable dicarboxylic acids include terephthalic acid, isophthalic acid, phthalic acid, maleic acid, fumaric acid, itaconic acid, glutaconic acid, citraconic acid, and mesaconic acid. The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamides, if desired.

A number of polyalkylene polyamines, including polyethylene polyamines, polypropylene polyamines, polybutylene polyamines and the like can be employed. Polyalkylene polyamines can be represented as polyamines in which the nitrogen atoms are liked together by groups of the formula $—C_nH_{2n}—$ where n is a small integer greater than unity and the number of such groups in the molecule ranges from two up to about eight. The nitrogen atoms can be attached to adjacent carbon atoms in the group $—C_nH_{2n}—$ or to carbon atoms farther apart, but not to the same carbon atom. Polyamines such as diethylenetriamine, triethylenetetramine, tetraethylenepentamine, and dipropylenetriamine, which can be obtained in reasonably pure form are suitable for preparing water-soluble aminopolyamides. Other polyalkylene polyamines that can be used include methyl bis-(3-aminopropyl)amine; methyl bis-(2-aminoethyl)amine; and 4,7-dimethyltriethylenetetramine. Mixtures of polyalkylene polyamines can be used, if desired.

The spacing of an amino group on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

The temperatures employed for carrying out the reaction between the dicarboxylic acid and the polyalkylene polyamine may vary from about 110° C. to about 250° C. or higher at atmospheric pressure. For most purposes, however, temperatures between about 160°

C. and 210° C. have been found satisfactory and are preferred. Where reduced pressures are employed, somewhat lower temperatures may be utilized. The time of reaction depends on the temperatures and pressures utilized and will ordinarily vary from about one-half to two hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products when reacted with epichlorohydrin, do not produce resins having the desired efficiency for use herein.

In converting the aminopolyamide, formed as above described, to a cationic thermosetting resin, it is reacted with epichlorohydrin at a temperature from about 45° C. to about 100° C. and preferably between about 45° C. and 70° C. until the viscosity of a 20% solids solution at 25° C. has reached about C or higher on the Gardner scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to the desired amount, i.e., about 10% more or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product. However, sulfuric acid is preferred.

In the aminopolyamide-epichlorohydrin reaction, it is preferred to use sufficient epichlorohydrin to convert all secondary amine groups to tertiary amine groups. However, more or less may be added to moderate or increase reaction rates. In general, satisfactory results may be obtained utilizing from about 0.5 mole to about 1.8 moles of epichlorohydrin for each secondary or tertiary amine group of the aminopolyamide. It is preferred to utilize from about 1.0 mole to about 1.5 moles for each secondary amine group of the aminopolyamide.

The other group of cationic resins which are useful in preparing the dispersions of this invention is composed of the reaction products of epichlorohydrin and the condensates of a polyalkylene polyamine with cyanamide or dicyandiamide. The polyalkylene polyamines which can be reacted with cyanamide or dicyandiamide have the formula $H_2N(C_nH_{2n}NH)_xH$ wherein n is an integer 2 through 8 and x is an integer 2 or more, preferably 2 through 6. Examples of such polyalkylene polyamines are the polyethylene polyamines, polypropylene polyamines and polybutylene polyamines. Specific examples of these polyalkylene polyamines include diethylenetriamine, triethylenetetramine, tetraethylenepentamine, bis(hexamethylene)triamine and dipropylenetriamine. Other polyalkylene polyamines that can be used include methyl bis(3-aminopropyl)amine methyl bis(2-aminoethyl)amine; and 4,7-dimethyltriethylenetetramine. Mixtures of polyalkylene polyamines can be used if desired. The relative proportions of polyalkylene polyamine and cyanamide or dicyandiamide will vary depending upon the particular polyalkylene polyamine used. In general, however, there is used from about 0.1 to about 1.0 mole of dicyandiamide for every equivalent of primary amine groups in the polyalkylene polyamine. For example, diethylenetriamine will require from about 0.2 to about 2.0 moles of dicyandiamide. In any given case, the amount of cyanamide, when used, will be twice the amount of dicyandiamide.

The condensation of the polyalkylene polyamine with cyanamide or dicyandiamide is carried out by heating the reactants at a temperature in the range of from about 100° to about 200° C., preferably from about 130° to about 160° C. Generally, it is not necessary to use a solvent, but if one is desired, the mono- or di-alkyl ethers of ethylene glycol or diethylene glycol are suitabled. During the reaction, ammonia is evolved. Upon completion of the reaction, the reaction mixture is diluted with water to a solids content of, for example, about 25%, and the resulting product is suitable for reaction with epichlorohydrin to provide a water-soluble, cationic polymer useful in accordance with this invention. The reaction with epichlorohydrin generally is carried out under conditions similar to those already described for preparation of the epichlorohydrin-modified aminopolyamides.

In preparing the initial emulsion containing the ketene dimer, the dispersing agent and water, the amount of dispersing agent will normally be from about 0.5 to about 15% by weight based on the amount of the ketene dimer, and the solids content of the emulsion will usually be from about 5 to about 25% by weight. Moreover, in the final dispersion, the weight ratio of ketene dimer to the cationic resin will be in the range of from about 4:1 to about 1:3, preferably from about 2:1 to about 2:3.

Having generally outlined the embodiments of this invention, the following examples constitute specific illustrations thereof. All parts and percentages are by weight unless otherwise specified.

EXAMPLE A

A cationic, water-soluble, nitrogen-containing polymer was prepared from diethylenetriamine, adipic acid and epichlorohydrin. Diethylenetriamine in the amount of 0.97 mole was added to a reaction vessel equipped with a mechanical stirrer, a thermometer and a reflux condenser. There then was gradually added to the reaction vessel one mole of adipic acid with stirring. After the acid had dissolved in the amine, the reaction mixture was heated to 170°–175° C. and held at that temperature for one and one-half hours, at which time the reaction mixture had become very viscous. The reaction mixture then was cooled to 140° C., and sufficient water was added to provide the resulting polyamide solution with a solids content of about 50%. A sample of the polyamide isolated from this solution was found to have a reduced specific viscosity of 0.155 deciliters per gram when measured at a concentration of two percent in a one molar aqueous solution of ammonium chloride. The polyamide solution was diluted to 13.5% solids and heated to 40° C., and epichlorohydrin was slowly added in an amount corresponding to 1.32 moles per mole of secondary amide in the polyamide. The reaction mixture then was heated at a temperature between 70° and 75° C. until it attained a Gardner viscosity of E-F. Sufficient water next was added to provide a solids content of about 12.5%, and the solution was cooled to 25° C. The pH of the solution then was adjusted to 4.7 with concentrated sulfuric acid. The final product contained 12.5% solids and had a Gardner viscosity of B-C.

EXAMPLE B

Another representative cationic, water-soluble, nitrogen-containing polymer was prepared, this time using diethylenetriamine, dicyandiamide and epichlorohydrin as the reactants. Diethylenetriamine in the amount of 206.4 parts was added to a reaction vessel equipped with a mechanical stirrer, a thermometer and a reflux condenser. There then was gradually added to the reaction vessel 165 parts of dicyandiamide with stirring. The reaction mixture was slowly heated to 130° C., at which point ammonia was vigorously evolved and the temperature of the reaction mixture exothermically rose to 160° C. After holding the temperature at 160° C. for three hours, the reaction mixture was cooled and diluted by the addition of sufficient water to provide the resulting suspension of the condensate product with a solids content of 58.8%.

Eighty-five parts of the above suspension was diluted with water to a solids content of 25% and added to a reaction vessel equipped with a mechanical stirrer, a thermometer and a reflux condenser. After heating the mixture to 60° C., with stirring 35.5 parts of epichlorohydrin was slowly added to the reaction vessel, maintaining the temperature at 60° C. The reaction mixture was maintained at about 60° C. until a Gardner-Holdt viscosity of N was reached, at which point 200 parts water was added to terminate the reaction. After adjusting the pH of the solution to 5 by the addition of formic acid, the solids content was 19.4%, which was further diluted to 18% by addition of water.

EXAMPLE 1

12 grams of the formaldehyde condensation product of sodium naphthalenesulfonate (available commercially under the proprietary designation Tamol SN) was dissolved in 2000 grams of water and heated to and maintained at about 60°-65° C. The pH of the resulting solution was adjusted to 4 with sulfuric acid, and then 276 grams of a ketene dimer prepared from a mixture of palmitic and stearic acids was added to provide a premix. The premix was stirred for 5 minutes at 60°-65° C. in the mix tank of a preheated two-stage Manton-Gaulin laboratory homogenizer and then passed through the homogenizer. The homogenizer pressure in the first stage was 6000 p.s.i. and 1500 p.s.i. in the second stage. The resulting emulsion had a solids content of about 9.6%. The hot homogenized product was quickly cooled to 32° C. in a water bath.

EXAMPLE 2

12 Grams of sodium lignin sulfonate (available commercially under the proprietary designation Lignasol XD) was dissolved in 2000 grams of water and heated to and maintained at about 60°-65° C. The pH of the resulting solution was adjusted to 4 with sulfuric acid, and then 276 grams of a ketene dimer prepared from a mixture of palmitic and stearic acids was added to provide a premix. The premix was stirred for 5 minutes at 60°-65° C. in the mix tank of a preheated two-stage Manton-Gaulin laboratory homogenizer and then passed through the homogenizer. The homogenizer pressure in the first stage was 6000 p.s.i. and 1500 p.s.i. in the second stage. The resulting emulsion had a solids content of about 10.7%. The hot homogenized product was quickly cooled to 32° C. in a water bath.

EXAMPLE 3

659 Grams of the emulsion of Example 1 was added to the premix tank of a Manton-Gaulin two-stage homogenizer and heated to 40° C. Then 500 grams of the aqueous resin solution (18% solids) of Example B was added to the diluted emulsion with vigorous stirring. The resulting mixture was homogenized by passing through the homogenizer at 3000 p.s.i. in the first stage. No pressure was applied at the second stage. The resulting product had a solids content of about 12.7%.

EXAMPLE 4

588 Grams of the emulsion of Example 2 was added to the premix tank of a Manton-Gaulin two-stage homogenizer and diluted by the addition of 71 grams of water. The diluted emulsion was heated to 40° C. Then 500 grams of the aqueous resin solution (18% solids) of Example B was added to the diluted emulsion with vigorous stirring. The resulting mixture was homogenized by passing through the homogenizer at 3000 p.s.i. in the first stage. No pressure was applied at the second stage. The resulting product had a solids content of about 13.3%.

EXAMPLE 5

22.5 Grams of sodium lignin sulfonate (available commercially under the proprietary designation Lignasol XD) was dissolved in 2025 grams of water and heated to and maintained at about 60°-65° C. The pH of the resulting solution was adjusted to 5 with sulfuric acid, and then 450 grams of a ketene dimer prepared from a mixture of palmitic and stearic acids was added to provide a premix. The premix was stirred for 5 minutes at 60°-65° C. in the mix tank of a preheated two-stage Manton-Gaulin laboratory homogenizer and then passed through the homogenizer. The homogenizer pressure in the first stage was 6000 p.s.i. No pressure was applied at the second stage. The resulting emulsion had a solids content of about 19.4%. The hot homogenized product was quickly cooled to 32° C. in a water bath.

EXAMPLE 6

To 389 grams of the emulsion of Example 5 was added 32 grams of water to provide an emulsion having a solids content of about 18%. This diluted emulsion was heated to 40° C. in the premix tank of a Manton-Gaulin two-stage homogenizer. Then 864 grams of the aqueous resin solution (12.5% solids) of Example A was added to the diluted emulsion with vigorous stirring. The resulting mixture was homogenized by passing through the homogenizer at 2500 p.s.i. in the first stage. No pressure was applied at the second stage. The resulting product had a solids content of about 14.3%.

EXAMPLE 7

Handsheets were prepared using the sizing composition emulsions of Examples 3, 4 and 6. The handsheets were prepared on a Noble and Wood handsheet machine using a 50% hardwood:50% softwood kraft pulp furnish beaten to 500 Canadian Standard Freeness in water containaing 100 ppm. hardness and 150 ppm. alkalinity, both expressed as calcium carbonate. The pulp is diluted to 0.25% consistency in the proportioner. The pulp is then diluted further in the deckle box to 0.025% consistency and then the sheet is formed at pH of about 7.5-8.5. The emulsion of the sizing composition is then added to the aliquot taken from the proportioner just prior to dilution of the pulp in the deckle box. The emulsion was added in an amount sufficient to provide about 0.25% of the sizing composition based on the dry weight of the pulp. A closed white water system was used. Formed sheets were wet-pressed to 33% solids and then dried at 240° F. on a steam-heated drum drier for about 45 seconds. The first four sheets of paper prepared were discarded and the next five were tested for sizing properties. The test result set forth in Table I for each sizing composition is the average of five sheets tested. The handsheets were 40 lb./3000 ft.$^2$ basis weight.

The sizing is measured by the Hercules Size Test with test solution No. 2 to 80% reflectance. The off-the-machine data were obtained within three minutes after drying and natural aged data were obtained after 7 days storage at 72° F. and 50% relative humidity.

TABLE I

| Sizing Composition | Hercules Size Test (seconds) | |
| --- | --- | --- |
| of Example | Off-The-Machine | Natural Aged |
| 3 | 609 | 692 |
| 4 | 651 | 738 |
| 6 | 484 | 908 |

It is to be understood that the above description and working examples are illustrative of the invention and not in limitation thereof.

What I claim and desire to protect by Letters Patent is:

1. As an improved paper sizing composition, a ketene dimer dispersion consisting essentially of said dimer, an anionic dispersing agent selected from the group consisting of sodium lignin sulfonate, the condensation product of formaldehyde and sodium naphthalene sulfonate and mixtures thereof, a cationic resin which is the reaction product of epichlorohydrin with a polymer selected from the group consisting of (a) an aminopolyamide derived from a dicarboxylic acid and a polyalkylene polyamine having two primary amine groups and at least one secondary or tertiary amine group or (b) a condensate of cyanamide or dicyandiamide with a polyalkylene polyamine having the formula $H_2N(C_nH_{2n}NH)_xH$, wherein n is an integer 2 through 8 and x is an integer 2 or more, and water.

2. The composition of claim 1 wherein the ketene dimer is a mixture of hexadecyl and octadecyl ketene dimers.

3. The composition of claim 1 wherein the anionic dispersing agent is sodium lignin sulfonate.

4. The composition of claim 1 wherein the anionic dispersing agent is the condensation product of formaldehyde and sodium naphthalene sulfonate.

5. The composition of claim 1 wherein the cationic resin is the reaction product of epichlorohydrin and an aminopolyamide derived from a dicarboxylic acid and a polyalkylene polyamine having two primary amine groups and at least one secondary or tertiary amine group.

6. The composition of claim 5 wherein the aminopolyamide is derived from adipic acid and diethylenetriamine.

7. The composition of claim 1 wherein the cationic resin is the reaction product of epichlorohydrin and the condensate of dicyandiamide with a polyalkylene polyamine having the formula $H_2N(C_nH_{2n}NH)_xH$, wherein n is an integer 2 through 8 and x is an integer 2 or more.

8. The composition of claim 7 wherein the the polyalkylene polyamine is diethylenetriamine.

* * * * *